United States Patent
Bednarek et al.

(10) Patent No.: US 10,106,204 B2
(45) Date of Patent: Oct. 23, 2018

(54) VEHICLE JOINT ASSEMBLY WITH EXPANDABLE STRUCTURAL MATERIAL

(71) Applicant: Ford Global Technologies, LLC, Dearborn, MI (US)

(72) Inventors: Maciej Bednarek, Windsor (CA); Michael James Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/440,035

(22) Filed: Feb. 23, 2017

(65) Prior Publication Data
US 2018/0237077 A1 Aug. 23, 2018

(51) Int. Cl.
| | |
|---|---|
| *B62D 27/02* | (2006.01) |
| *B62D 25/06* | (2006.01) |
| *B62D 29/00* | (2006.01) |
| *B62D 25/02* | (2006.01) |
| *B62D 25/04* | (2006.01) |
| *B29C 44/12* | (2006.01) |
| *B29C 44/34* | (2006.01) |
| *B29C 44/38* | (2006.01) |
| *B29K 105/04* | (2006.01) |

(Continued)

(52) U.S. Cl.
CPC ........ *B62D 27/023* (2013.01); *B29C 44/1242* (2013.01); *B29C 44/3415* (2013.01); *B29C 44/38* (2013.01); *B62D 25/04* (2013.01); *B62D 25/06* (2013.01); *B29K 2063/00* (2013.01); *B29K 2105/04* (2013.01); *B29L 2031/30* (2013.01)

(58) Field of Classification Search
CPC ...... B62D 27/023; B62D 25/06; B62D 25/04; B29C 44/38; B29C 44/1242; B29C 44/3415; B29L 2031/30; B29K 2063/00; B29K 2105/04
USPC .......................................................... 296/29
See application file for complete search history.

(56) References Cited

U.S. PATENT DOCUMENTS

| 4,563,545 A | 1/1986 | Dzomba | |
|---|---|---|---|
| 8,163,116 B2 * | 4/2012 | Riley | B62D 23/005 |
| | | | 156/294 |

(Continued)

FOREIGN PATENT DOCUMENTS

DE  102006040759 B3  2/2008

*Primary Examiner* — Joseph D. Pape
*Assistant Examiner* — Dana D Ivey
(74) *Attorney, Agent, or Firm* — Jason C. Rogers; Brooks Kushman P.C.

(57) ABSTRACT

A vehicle joint assembly may include a lower housing, an upper housing, an expandable material, first and second vehicle components, and a fastener. The lower housing may define a first cavity. The upper housing may define a second cavity and may be sized for partial disposal within the lower housing. The expandable material may be disposed within the second cavity. The first and second vehicle components may each include contact surfaces. The fastener may extend through through-holes defined by the lower and upper housings to secure the first and second vehicle components to one another. Subjecting the expandable material to heat may move the upper housing to contact one of the contact surfaces. The expandable material may be configured to expand when subjected to heat from a paint oven of a vehicle assembly process.

17 Claims, 5 Drawing Sheets

(51) Int. Cl.
  *B29K 63/00* (2006.01)
  *B29L 31/30* (2006.01)

(56) References Cited

U.S. PATENT DOCUMENTS 8,915,530 B2 * 12/2014 Wagner ................ B23K 26/28
                                                29/897.2
9,151,413 B2   10/2015 Marold et al.

* cited by examiner

VEHICLE JOINT ASSEMBLY WITH EXPANDABLE STRUCTURAL MATERIAL

TECHNICAL FIELD

The present disclosure relates to assemblies for vehicle joints.

BACKGROUND

Vehicle body builds accommodate assembly variations with compensating bushings for bolted joints. The compensating bushings may include mechanical features that are not as robust as manufacturing rates require.

SUMMARY

A vehicle joint assembly includes a lower housing, an upper housing, an expandable material, first and second vehicle components, and a fastener. The lower housing defines a first cavity. The upper housing defines a second cavity and is sized for partial disposal within the lower housing. The expandable material is disposed within the second cavity. The first and second vehicle components each includes contact surfaces. The fastener is for extending through through-holes defined by the lower and upper housings to secure the first and second vehicle components to one another. Subjecting the expandable material to heat moves the upper housing to contact one of the contact surfaces. The expandable material may be configured to expand when subjected to heat from a paint oven of a vehicle assembly process. The lower housing may include first ledges each extending about the lower housing at one of an inner upper portion and an outer upper portion. The upper housing may include second ledges each extending about the upper housing at one of an inner lower portion and an outer lower portion. The housings may be arranged with one another such that the first ledges contact the second ledges when the material fill member expands to constrain the expansion. The expandable material may be an epoxy-based structural foam. A temperature of the heat applied to the expandable material may be between 43 degrees Celsius and 205 degrees Celsius. The first vehicle component may be a vehicle body pillar and the second vehicle component may be a vehicle roof rail. An inner surface of the lower housing may define ratchet steps. A lower portion of the upper housing may be shaped to rest at the ratchet steps for support as the upper housing incrementally moves upward due to expansion of the expandable material.

A vehicle joint assembly includes a lower housing, an upper housing, a fastener, and a material fill member. The lower housing defines a first cavity. The upper housing defines a second cavity and is sized for partial disposal within the first cavity. The fastener extends through through-holes of the housings to secure two vehicle components to one another. The material fill member is disposed within the first cavity or the second cavity. The lower housing and the upper housing are arranged with one another so that expansion of the material fill member moves the upper housing to contact a contact surface of one of the two vehicle components. An amount of the material fill member may be selected to substantially fill a volume of the first and second cavities when the material fill member expands. The material fill member may be an epoxy-based structural foam. The assembly may further include a first chemically reactive material and the material fill member may be a second chemically reactive material. The first and second chemically reactive materials may expand when in contact with one another to move the upper housing to contact the contact surface of one of the two vehicle components. Each of the lower housing and the upper housing may define an aperture in registration with one another for injecting the first chemically reactive material therethrough. Each of the lower housing and the upper housing may define an aperture in registration with one another for injecting the first chemically reactive material therethrough. An inner surface of the lower housing may define ratchet steps and a lower portion of the upper housing may be shaped to rest at the ratchet steps for support as the upper housing incrementally moves upward due to expansion of the material fill member.

A vehicle joint assembly includes a vehicle body pillar, a roof panel, a joint assembly, and an expandable material. The roof panel is for mounting to the pillar. The joint assembly includes a first housing and cavity and a second housing partially disposed within the cavity. A fastener extends through the housings to secure the panel and pillar to one another. The expandable material is for disposal within the cavity for selective expansion to move the second housing to contact the panel. The expandable material may be configured to expand when subjected to heat from a paint oven of a vehicle assembly process. The first housing may include first ledges each extending about the first housing at one of an inner upper portion and an outer upper portion. The second housing may include second ledges each extending about the second housing at one of an inner lower portion and an outer lower portion. The housing may be arranged with one another such that the first ledges contact the second ledges when the material fill member expands to constrain the material fill member expansion. The expandable material may be configured to expand when subjected to heat, and may be an epoxy-based structural foam. The expandable material may be configured to expand when subjected to a chemically reactive material via an injection port extending through the first and second housings. An inner surface of the lower housing may define ratchet steps and a lower portion of the second housing may be shaped to rest at the ratchet steps for support as the second housing incrementally moves upward due to expansion of the material fill member.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
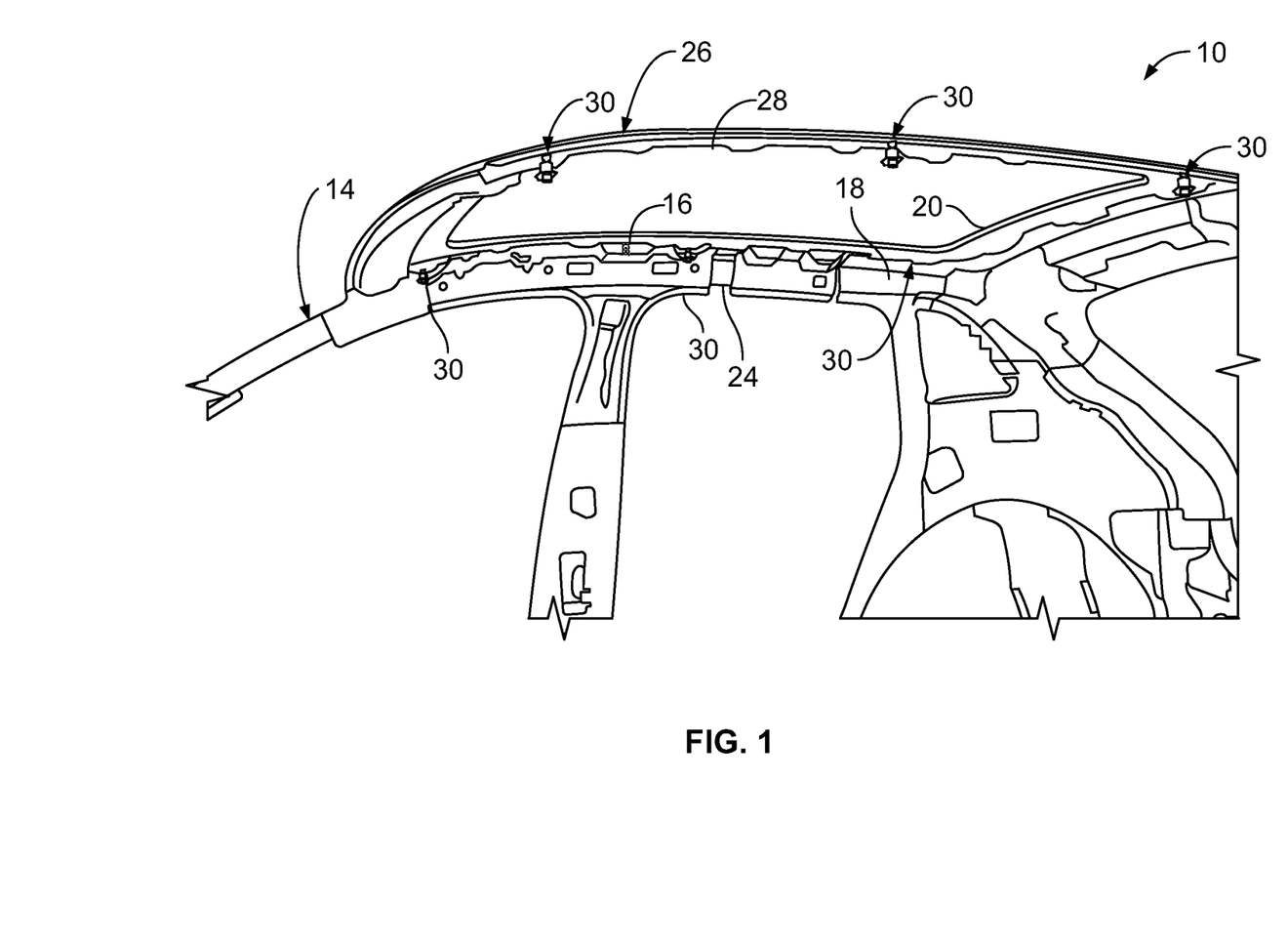
FIG. 1 is a fragmentary perspective view of a portion of an example of a vehicle body.

FIG. 1 shows an example of a portion of a vehicle body, referred to as a vehicle body 10 herein. The vehicle body 10 includes an A-pillar 14, a B-pillar 16, a C-pillar 18, and a D-pillar 20. Each of the pillars may be made of one or more components. A roof rail 24 connects to an upper portion of each of the pillars. A roof panel 26 is mounted to the roof rail 24 and may define an opening sized to receive a moon roof. Joint locations 30 may be dispersed throughout the vehicle body 10 to assemble vehicle components to one another. For example, the joint locations may be areas to secure one of the pillars or the roof rail 24 to the roof panel 26 by a joint assembly.

Figure 2:
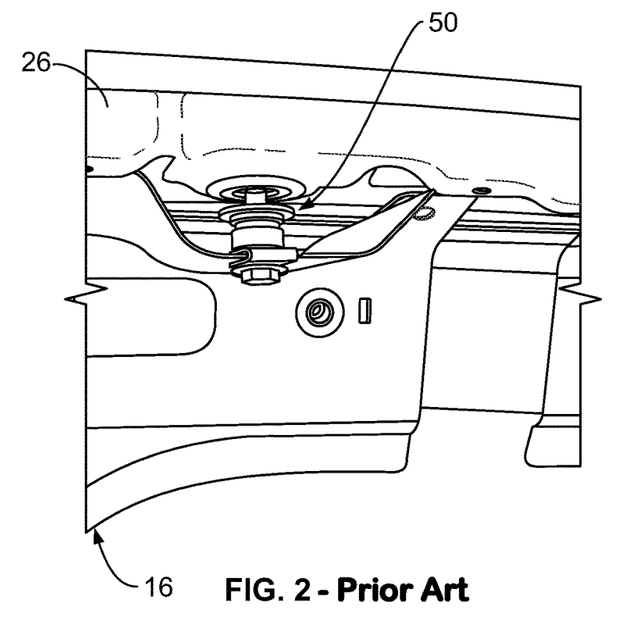
FIG. 2 is a fragmentary perspective view of an example of a previously known joint assembly secured to a vehicle body.
Figure 3:
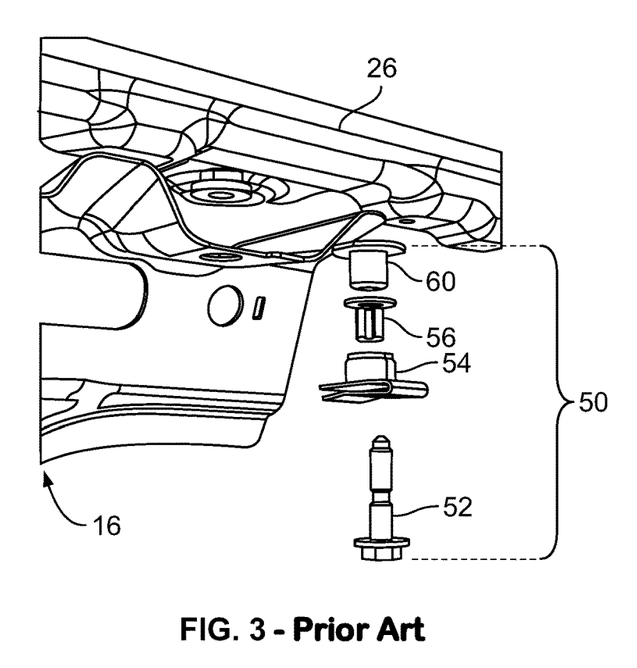
FIG. 3 is an exploded view of the joint assembly of FIG. 2.

FIG. 2 shows an example of a previously known joint assembly 50 mounted to the roof panel 26 and the B-pillar 16. FIG. 3 shows an exploded view of the joint assembly 50 of FIG. 2. The joint assembly 50 includes a bolt 52, a fixed nut 54 with a J-clip feature, an expander 56, and a receiving housing 60. The joint assembly 50 assists in securing a portion of the B-pillar 16 to the roof panel 26. As shown in FIG. 2, a space exists between a portion of the joint assembly 50 and the roof panel 26. This space may be due to assembly variables such as vehicle component variances. Mechanical fastening is used to eliminate the space in an additional assembly step. For example, tightening the bolt 52 directs expander 56 to expand and push the receiving housing 60 upward to contact the vehicle component.

Figure 4:
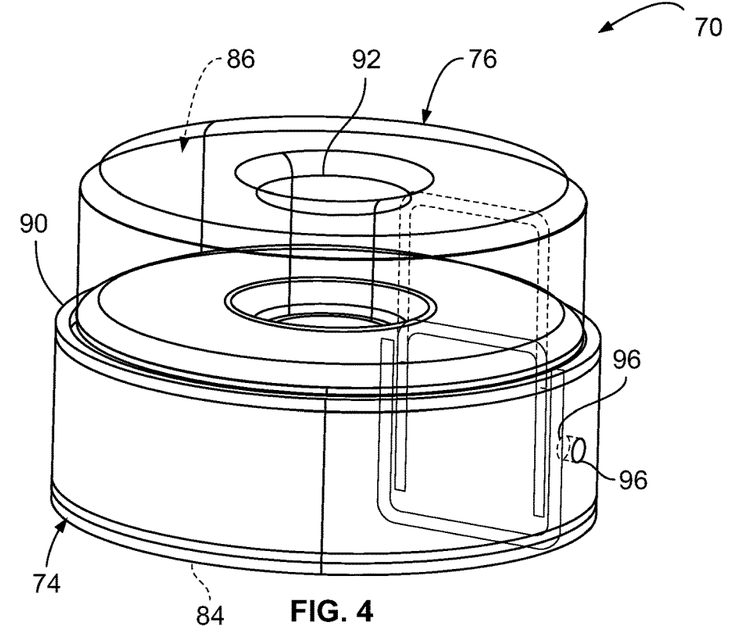
FIG. 4 is a perspective view of a portion of a joint assembly for a vehicle body shown in a first configuration.
Figure 5:
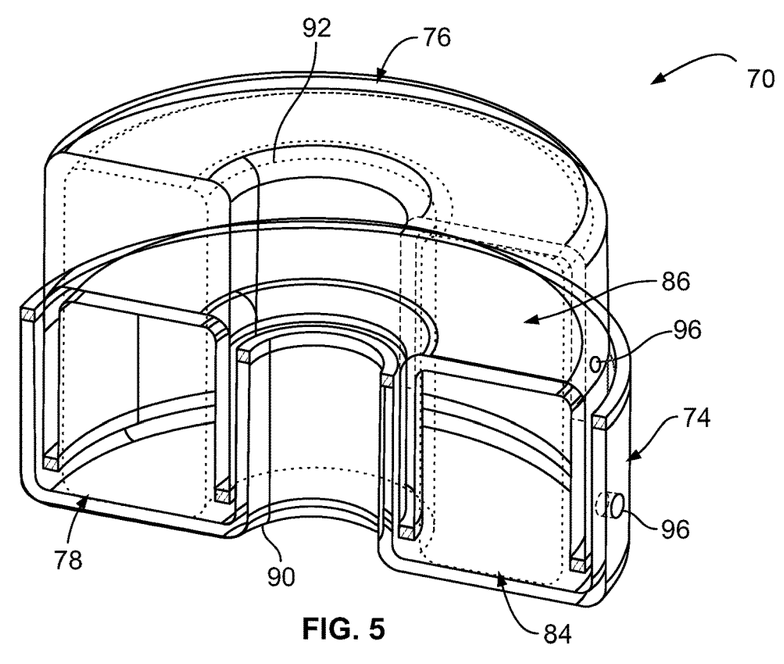
FIG. 5 is a perspective view of the portion of the joint assembly of FIG. 4 shown in a second configuration.

In contrast, FIGS. 4 through 8 show an example of a portion of a joint assembly 70 for a vehicle in which space between the joint assembly 70 and vehicle component contact surfaces is eliminated without mechanical fastening. FIG. 4 shows the joint assembly 70 in a first configuration and FIG. 5 shows the joint assembly 70 in a second configuration. The joint assembly 70 includes a lower housing 74, an upper housing 76, a material fill member 78, and a bolt 80. The lower housing 74 defines a first cavity 84 and the upper housing 76 defines a second cavity 86. It is contemplated that the joint assembly 70 may operate with the lower housing 74 and the upper housing 76 being arranged with one another in a configuration opposite the configuration shown in FIGS. 4 and 5. In one example, each of the housings defines a U-shape profile. The lower housing 74 and the upper housing 76 may be stamped, molded, or injection molded high strength nylon or acrylonitrile butadiene styrene (ABS).

The upper housing 76 is sized for partial disposal within the first cavity 84. The lower housing 74 defines a first through-hole 90 and the upper housing 76 defines a second through-hole 92. The first through-hole 90 and the second through-hole 92 may be arranged with one another to receive a fastener, such as the bolt 80, therethrough. In this example, the lower housing 74 and the upper housing 76 are cylindrical in shape. However, it is contemplated that the lower housing 74 and the upper housing 76 may have other shapes, such as square or hexagonal. A shape of the lower housing 74 and the upper housing 76 may also be based on available package space about the housings.

The material fill member 78 may have physical properties to expand and substantially fill a volume of the first cavity 84 and the second cavity 86 under certain conditions. For example, the material fill member 78 may be an epoxy-based structural foam material. The material may expand when subjected to heat, such as during a vehicle assembly operation. An amount of the material fill member 78 may be selected to substantially fill a volume of the first cavity 84 and the second cavity 86 following expansion of the material fill member 78.

In another joint assembly example, chemically reactive material may be used for the material fill member 78. A first chemically reactive material may be disposed within the first cavity 84 and the second cavity 86. A second chemically reactive material may be injected through a pair of ports 96. Alternatively, the first chemically reactive material and the second chemically reactive material may be injected through the pair of ports 96 simultaneously or in subsequent steps. Contact between the first chemically reactive material and the second chemically reactive material causes the materials to expand to move the upper housing 76 upward. Examples of the first chemically reactive material and the second chemically reactive material include an epoxy adhesive two-component material having structure supporting attributes.

Expansion of the material fill member 78 moves the upper housing 76 for contact with a contact surface of a vehicle component without mechanical fastening. The contact between the upper housing 76 and the contact surface eliminates a space between the two to provide a structurally improved attachment. Using the expandable characteristics of the material fill member 78 to move the upper housing 76 eliminates an assembly step required with previous joint assemblies using a mechanical expander.

Figure 6:
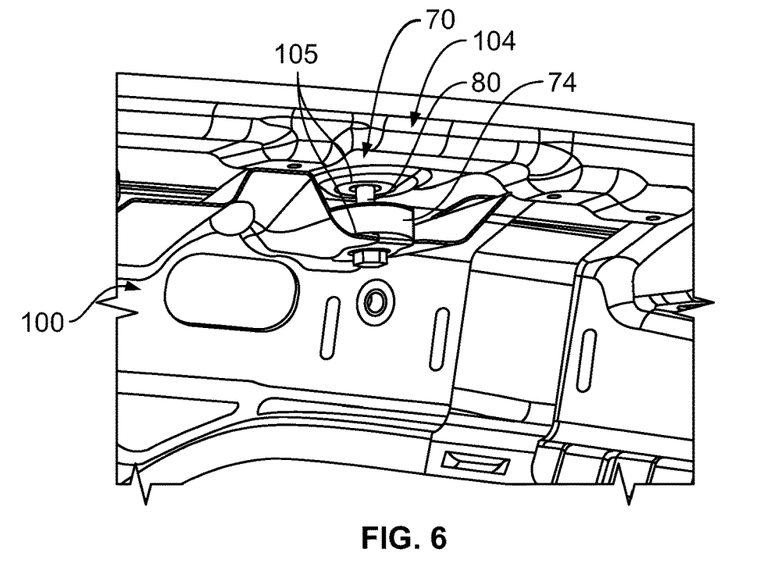
FIG. 6 is a fragmentary perspective view of a portion of an example of a joint assembly in a first configuration secured to a vehicle body.
Figure 7:
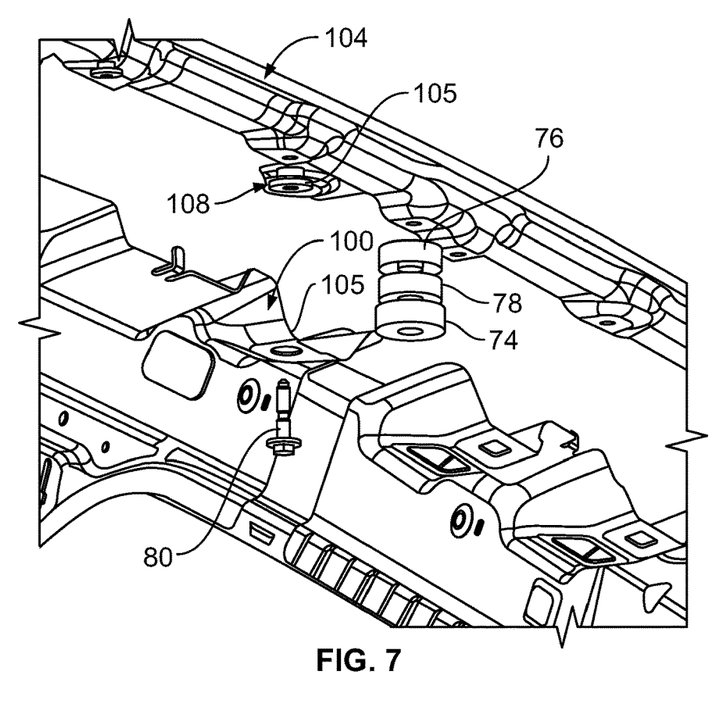
FIG. 7 is a fragmentary perspective view of the portion of the vehicle body of FIG. 6 and an exploded perspective view of the joint assembly of FIG. 6.
Figure 8:
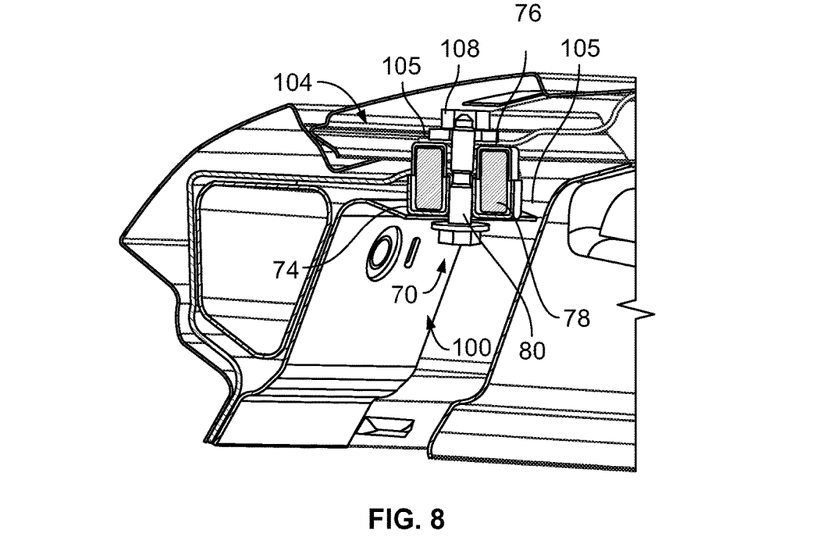
FIG. 8 is a fragmentary perspective view, in partial cross-section, of the portion of the vehicle body of FIG. 6 and the joint assembly of FIG. 6 in a second configuration.

For example, and continuing to refer to FIGS. 6 through 8, a vehicle B-pillar 100 and a roof panel 104 may each include a contact surface 105. The joint assembly 70 may secure a vehicle pillar, such as the B-pillar 100, and the roof panel 104 to one another at the contact surfaces 105. Each of the contact surfaces 105 may be a portion of the respective vehicle pillar or the roof panel 104. Alternatively, one or both of the contact surfaces 105 may be defined by a nut, such as a nut 108.

In a vehicle assembly operation, a paint oven may be used to apply heat to the joint assembly 70 to trigger expansion of the material fill member 78. For example, the joint assembly 70 may secure the B-pillar 100 to the roof panel 104 in a first operation. In a subsequent second operation, the B-pillar 100, the roof panel 104, and the joint assembly 70 may be subjected to a paint oven. Heat from the paint oven may expand the material fill member 78 to move the upper housing 76 to contact the contact surface 105 of the roof panel. Heat from the paint oven may be at a temperature between 43 degrees Celsius and 205 degrees Celsius.

In one example, the roof panel 104 is a moon roof panel including an opening sized to receive a moon roof. Other examples of joint locations for the joint assembly 70 include radiator supports to fender supports and body side outer components to cowl side inner components for instrument panel attachments.

Figure 9:
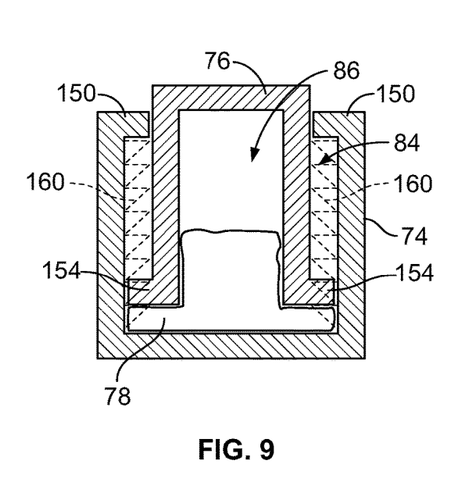
FIG. 9 is a front view, in cross-section, of an example of a portion of a joint assembly shown in a third configuration.
Figure 10:
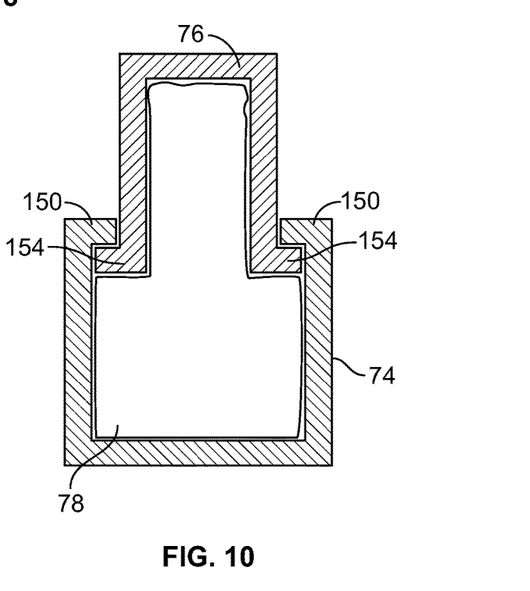
FIG. 10 is a front view, in cross-section, of the portion of the joint assembly of FIG. 9 shown in a fourth configuration.

The lower housing 74 and the upper housing 76 may constrain expansion of the material fill member 78. FIGS. 9 and 10 show an example cross-section profile of the lower housing 74 and the upper housing 76. The housings are arranged in a third configuration in FIG. 9 and a fourth configuration in FIG. 10. The lower housing 74 may include first ledges 150 extending about the lower housing 74 at an inner upper portion and an outer upper portion. The upper housing 76 may include second ledges 154 extending about the upper housing 76 at an inner lower portion and an outer lower portion. Expansion of the material fill member 78 directs the upper housing 76 upward until the first ledges 150 contact the second ledges 154 to constrain movement of the upper housing 76 and to constrain expansion of the material fill member 78.

The lower housing 74 and the upper housing 76 may include a ratcheting feature. For example, an inner surface of the lower housing 74 may optionally define ratchet steps 160. The second ledges 154 of the upper housing 76 may be shaped to rest at the ratchet steps 160 for support as the upper housing 76 incrementally moves upward.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle joint assembly comprising:
   a lower housing defining a first cavity and including first ledges each extending about the lower housing at one of an inner upper portion and an outer upper portion;
   an upper housing defining a second cavity, sized for partial disposal within the lower housing, and including second ledges each extending about the upper housing at one of an inner lower portion and an outer lower portion;
   an expandable material disposed within the second cavity;
   first and second vehicle components each including contact surfaces; and
   a fastener for extending through through-holes defined by the lower and upper housings to secure the first and second vehicle components to one another,
   wherein subjecting the expandable material to heat moves the upper housing to contact one of the contact surfaces, and wherein the housings are arranged with one another such that the first ledges contact the second ledges when the expandable material expands to constrain the expansion.

2. The assembly of claim 1, wherein the expandable material is configured to expand when subjected to heat from a paint oven of a vehicle assembly process.

3. The assembly of claim 1, wherein the expandable material is an epoxy-based structural foam.

4. The assembly of claim 1, wherein a temperature of the heat applied to the expandable material is between 43 degrees Celsius and 205 degrees Celsius.

5. The assembly of claim 1, wherein the first vehicle component is a vehicle body pillar and the second vehicle component is a vehicle roof rail.

6. The assembly of claim 1, wherein an inner surface of the lower housing defines ratchet steps, and wherein a lower portion of the upper housing is shaped to rest at the ratchet steps for support as the upper housing incrementally moves upward due to expansion of the expandable material.

7. A vehicle joint assembly comprising:
   a lower housing defining a first cavity including a material fill member;
   an upper housing defining a second cavity, sized for partial disposal within the first cavity, and arranged with the lower housing such that expansion of the material fill member moves the upper housing to contact a surface of one of two vehicle components; and
   a fastener for extending through housing through-holes to secure two vehicle components to one another,
   wherein the lower housing and the upper housing each define an aperture in registration with one another for injecting the material fill member therethrough.

8. The assembly of claim 7, wherein an amount of the material fill member is selected to substantially fill a volume of the first and second cavities when the material fill member expands.

9. The assembly of claim 7, wherein the material fill member is an epoxy-based structural foam.

10. The assembly of claim 7 further comprising a first chemically reactive material, wherein the material fill member is a second chemically reactive material, and wherein the first and second chemically reactive materials expand when in contact with one another to move the upper housing to contact the contact surface of one of the two vehicle components.

11. The assembly of claim 7, wherein the material fill member comprises a first chemically reactive material and a second chemically reactive material.

12. The assembly of claim 7, wherein an inner surface of the lower housing defines ratchet steps, and a lower portion of the upper housing is shaped to rest at the ratchet steps for support as the upper housing incrementally moves upward due to expansion of the material fill member.

13. A vehicle joint assembly comprising:
   a vehicle body pillar and roof panel for mounting thereto;
   a first housing defining first ledges extending about an upper portion and a cavity;
   a second housing partially disposed within the cavity and defining second ledges extending about a lower portion for contact with the first ledges when an expandable material within the cavity expands; and a fastener extending through the housings to secure the panel to the pillar.

14. The assembly of claim 13, wherein the expandable material is configured to expand when subjected to heat from a paint oven of a vehicle assembly process.

15. The assembly of claim 13, wherein the expandable material is configured to expand when subjected to heat, and is an epoxy-based structural foam.

16. The assembly of claim 13, wherein the expandable material is configured to expand when subjected to a chemically reactive material via an injection port extending through the first and second housings.

17. The assembly of claim 13, wherein an inner surface of the lower housing defines ratchet steps, and wherein the lower portion of the second housing is shaped to rest at the ratchet steps for support as the second housing incrementally moves upward due to expansion of the material fill member.

* * * * *